UNITED STATES PATENT OFFICE.

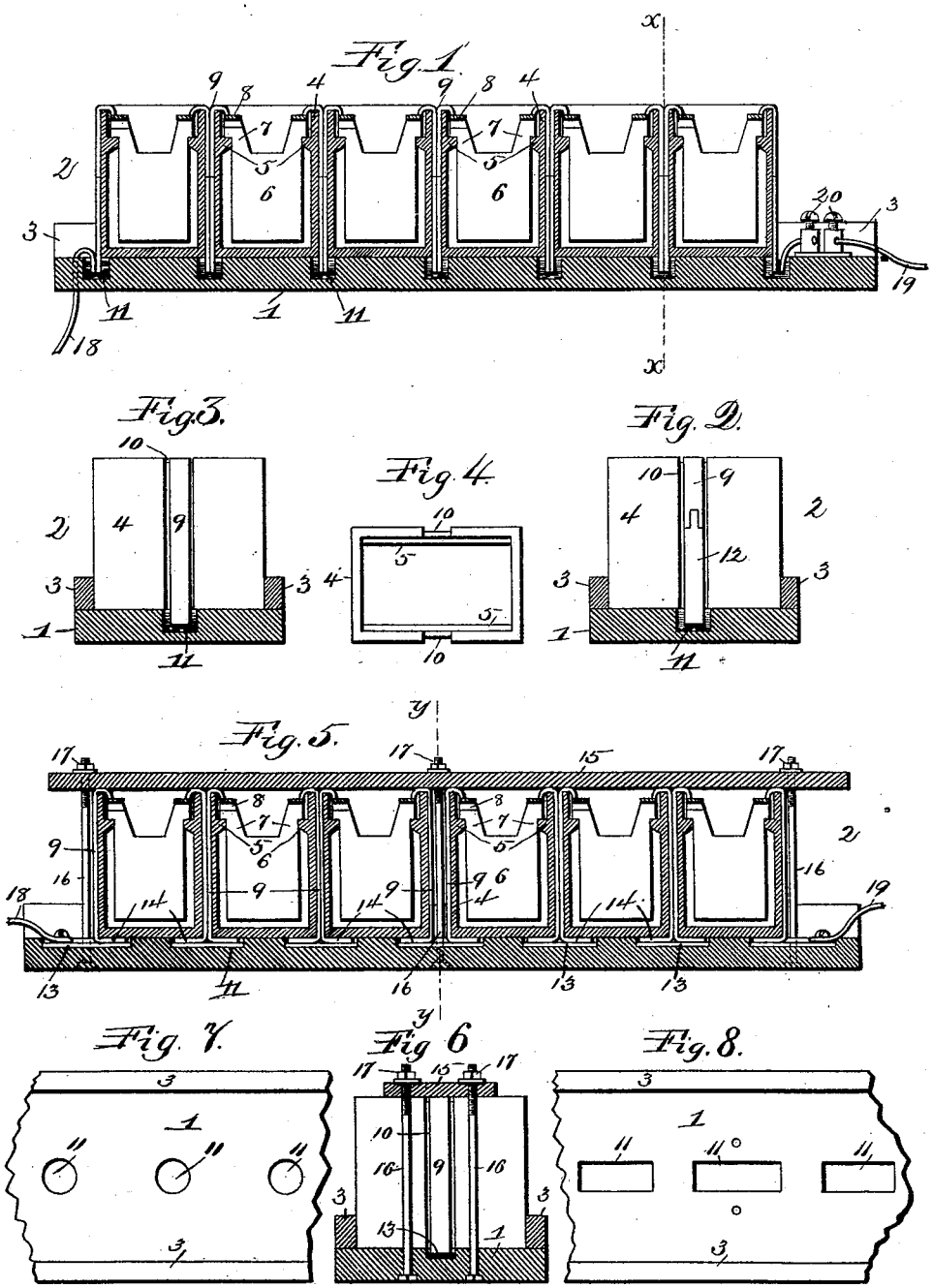

JAMES F. McLAUGHLIN, OF PHILADELPHIA, PENNSYLVANIA.

SECONDARY BATTERY.

SPECIFICATION forming part of Letters Patent No. 425,818, dated April 15, 1890.

Application filed January 8, 1890. Serial No. 336,245. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Secondary Electric Batteries, of which the following is a specification.

This invention is directed to secondary electric batteries, and its object is to so construct the cells and a tray provided for these batteries that the simple act of placing the cells upon the tray will close the connection between the cells, and the necessity of connecting the conducting-strips by clamping or otherwise is obviated.

To this end my invention consists, essentially, in a tray provided with recesses or troughs containing a suitable conducting material, liquid or solid, such as mercury or copper, in combination with a series of cells whose conducting-strips extend down along the sides and below the bottoms of the cells, so as to contact with or be immersed into the conducting material.

My invention also consists in making the conducting-strips in two parts, the lower part of which is of a material which is not affected by mercury.

My invention also consists in grooving the sides of the cell-jars for the reception of the downwardly-extending conductors for the sake of compactness and neatness of arrangement; and my invention consists in such other details of construction as will be hereinafter set forth, and pointed out in the claims.

I will now describe my invention in detail, reference being had to the accompanying drawings, in which—

Figure 1 represents a vertical longitudinal central section of a secondary battery embodying my invention; Fig. 2, a transverse vertical section thereof between two cells on line *x x* of Fig. 1; Fig. 3, a similar view showing a modification; Fig. 4, a plan of one of my cells; Fig. 5, a vertical longitudinal central section of a battery embodying a modification of my invention; Fig. 6, a transverse vertical section thereof between two cells on line *y y* of Fig. 5; and Figs. 7 and 8, plans of the battery-tray, showing two forms of the recesses or troughs for holding the conducting material.

The same numerals of reference represent the same parts throughout the drawings.

Referring now to Figs. 1 to 4 and 7, it will be seen that my battery consists, essentially, of a tray 1, of non-conducting material—such as wood, vulcanite, or the like—and a number of cells 2. The tray in this instance is formed with the flanges 3, for holding the cells in position. These cells consist of the glass jars 4, preferably rectangular in shape and provided each with two opposite horizontal ledges 5, for supporting the electrodes 6, of lead or equivalent material, which rest upon said ledges with the ears 7. These ears are bent over at right angles at 8 to form the point of contact or connection with the connecting-strips 9 for connecting the cells. These connecting-strips 9 run down along the side of the cell-jars, which are preferably grooved vertically, as at 10, for the reception of these strips, which are thus made flush, or approximately so, with the sides of the jars, rendering the battery compact and neat in appearance when assembled. These strips, it will be observed, extend down below the bottoms of the cell-jars, and when the cells are in position on the tray 1 dip into recesses or troughs 11, formed in said tray, which recesses are filled with mercury to a sufficient extent to immerse the ends of the strips 9. As shown in Fig. 7, these recesses are circular in shape for cheapness of construction; but of course any other shape will serve equally well.

Inasmuch as the mercury would in time amalgamate and destroy the ends of the immersed conducting-strips if the same were made of lead, copper, or other like metal, I preferably make said strips in two parts, as shown in Figs. 1 and 2, the lower part 12 of which is made of iron or other conducting material not affected by mercury and connected to the upper part in any suitable manner. It will be seen that this construction of the parts enables me to assemble the battery by merely placing the cells in position on the tray, the connection between said cells being established as soon as the conducting-strips 9 dip into the mercury in the troughs 11. The use of clamps or other means of coupling consuming time in their adjustment is thus entirely avoided.

In Figs. 5 and 6 I illustrate a slight modification of my invention. In this construction I substitute a solid conductor for the mercury in the former arrangement. Such an arrangement may often be desirable where the battery is subjected to jars and motion—for instance, when the battery is employed for electric railways and the liquid contents of the troughs 11 might become spilled, although this danger is not very great when these troughs are covered up by the cells, as in Fig. 1. It will be noted that the latter construction differs from that already described in that the troughs, preferably rectangular or elongated in shape, are filled or lined with a strip of solid conducting metal 13, while the conducting-strips 9, instead of extending straight downward, as in Fig. 1, are bent at 14 and folded or laid against the bottom of the jars 4.

When the cells are now placed in position on the tray 1, with the bent ends, one on each side of the jars, in register with the strips 13, their weight will cause the bent ends 14 to impinge with sufficient force against the strips 13 to establish a firm connection between the cells; but to make this connection more positive and not liable to be disturbed I provide in addition the confining-strip 15, which extends over the tops of all the cells and is secured to the tray 1 by the nut-bolts 16, screw-threaded at their upper ends and held in place by nuts 17, so that they can be readily unfastened for purposes of recharging, &c. The conducting-wires 18 and 19 serve the usual purpose of connecting the battery with the circuit, and the binding-posts 20 may or may not be employed.

Although I have described my invention as applicable particularly to secondary batteries, and although I consider the same especially valuable in connection with such batteries, still it is manifest that the same may be applied equally to primary batteries.

Having now described my invention and what I consider the best way of carrying the same into effect, what I claim, and desire to secure by Letters Patent, is—

1. In a secondary electric battery, the combination, with a tray provided at spaced intervals with troughs or recesses containing conducting material, of a series of cells having conducting-strips extending from the electrodes down below the bottoms of the cells, all substantially as described.

2. In a secondary electric battery, the combination, with a tray provided at spaced intervals with a series of troughs filled with mercury, of a series of cells having conducting-strips extending from the electrodes down into the mercury in the tray, all substantially as described.

3. In a secondary electric battery, a cell-jar provided with two exterior grooves at opposite sides of the jar, extending from the top to the bottom thereof, in combination with conducting-strips seated in said grooves and extending from the electrodes below the bottom of the jar, substantially as described.

4. In a secondary electric battery, the combination of a tray provided at spaced intervals with a series of troughs containing mercury, with a series of cells having conducting-strips extending from the electrodes down into the mercury in the tray, the terminals of which strips are of conducting material not affected by mercury, substantially as described.

In testimony whereof I have signed my name to this specification in the presence of two subscribing witnesses.

JAMES F. McLAUGHLIN.

Witnesses:
  H. F. REARDON,
  WILSON R. KER.